(12) United States Patent
Setton et al.

(10) Patent No.: US 8,307,024 B2
(45) Date of Patent: Nov. 6, 2012

(54) ASSISTED PEER-TO-PEER MEDIA STREAMING

(75) Inventors: Eric E. Setton, Palo Alto, CA (US); John G. Apostolopoulos, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 374 days.

(21) Appl. No.: 11/880,317

(22) Filed: Jul. 20, 2007

(65) Prior Publication Data

US 2009/0024754 A1 Jan. 22, 2009

(51) Int. Cl.
*G06F 15/16* (2006.01)

(52) U.S. Cl. .......................... 709/200; 709/227; 709/220

(58) Field of Classification Search ........................ None
See application file for complete search history.

(56) References Cited

U.S. PATENT DOCUMENTS

| | | | | |
|---|---|---|---|---|
| 6,732,180 | B1* | 5/2004 | Hale et al. | 709/229 |
| 6,760,589 | B1* | 7/2004 | Hobbis | 455/443 |
| 2002/0062375 | A1* | 5/2002 | Teodosiu et al. | 709/226 |
| 2003/0126277 | A1 | 7/2003 | Son et al. | |
| 2003/0145093 | A1* | 7/2003 | Oren et al. | 709/229 |
| 2004/0064511 | A1* | 4/2004 | Abdel-Aziz et al. | 709/206 |
| 2005/0015511 | A1* | 1/2005 | Izmailov et al. | 709/238 |
| 2006/0080454 | A1* | 4/2006 | Li | 709/231 |
| 2007/0094405 | A1 | 4/2007 | Zhang | |
| 2007/0174410 | A1* | 7/2007 | Croft et al. | 709/208 |
| 2007/0274327 | A1* | 11/2007 | Kaarela et al. | 370/401 |

FOREIGN PATENT DOCUMENTS

| | | |
|---|---|---|
| KR | 1020040096807 A | 11/2004 |
| KR | 1020070024747 A | 3/2007 |
| WO | 2008051681 A1 | 5/2008 |

OTHER PUBLICATIONS

Apostolopoulos, et al., "On Multiple Description Streaming with Content Delivery Networks", *IEEE INFOCOM*, Jun. 2002,1-10.
Banerjee, et al., "Scalable Application Layer Multicast", *Department of Computer Science, University of Maryland*, (2002),1-13.
Castro, et al., "SplitStream: High Band-width Multicasts in Cooperative Environments", *Microsoft Research/Rice University*, (2003).
Chen, et al., "Second Generation Error Concealment for Video Transport Over Error Prone Channels", *Carnegie Mellon University*, (2002),1-4.
Chu, et al., "Early Experience With an Internet Broadcast System Based on Overlay Multicast", *Carnegie Mellon University*, (Jun. 2004),1-15.
Chu, et al., "A Case for End System Multicast", *Carnegie Mellon University*, (Jun. 2000),1-15.
Cui, et al., "oStream: Asynchronous Streaming Multicast in Application-Layer Overlay Networks", *IEEE Journal on Selected Areas in Communications*, vol. 22, No. 1, Jan. 2004.

(Continued)

*Primary Examiner* — Wing Chan
*Assistant Examiner* — Andrew Woo

(57) ABSTRACT

Assisted peer-to-peer media streaming. A first connection to at least one peer of a peer-to-peer network is initiated for receiving media content from the peer-to-peer network. Responsive to a disruption of delivery of the media content over the first connection from the peer, the media content is received over a second connection with a data source, wherein the data source comprises the media content.

18 Claims, 8 Drawing Sheets

OTHER PUBLICATIONS

Kontothanassis, et al., "A Transport Layer for Live Streaming in a Content Delivery Network", *IEEE*, vol. 92, No. 9, Sep. 2004.

Zhang, et al., "Large-Scale Live Media Streaming over Peer-to-Peer Networks through Global Internet", (Nov. 2005).

Zhang, et al., "A Peer-to-Peer Network for Live Media Streaming—Using a Push-Pull Approach", (Nov. 2005).

Liu, et al., "Opportunities and Challenges of Peer-to-Peer Internet Video Broadcast", *Proceedings Of the IEEE*, (Nov. 3, 2006).

Cui, et al., "Layered Peer-to-Peer Streaming", *Department of Computer Science, University of Illinois*, (Jun. 2003).

Ganjam, et al., "Internet Multicast Video Delivery", (Jan. 2005).

Karlsson, et al., "A Framework for Evaluating Replica Placement Algorithms", *Copyright Hewlett-Packard Company 2002*, (2002).

Padmanabhan, et al., "Distributing Streaming Media Content Using Cooperative Networking", *Carnegie Mellon University*, (Apr. 2002).

Tran, et al., "Zigzag: An Efficient Peer-to-Peer Scheme for Media Streaming", (Apr. 2003).

Xu, et al., "A Peer-to-Peer Video-On-Demad System Using Multiple Description Coding and Server Diversity", *Polytechnic University*, (2004).

Xiang, et al., "Peer-to-Peer Based Multimedia Distribution Service", *IEEE Transactions on Multimedia*, vol. 6, No. 2, Apr. 2004.

Qiu, et al., "On the Placement of Web Server Replicas", (Apr. 2001).

Setton, et al., "Rate-Distortion Optimized Video Peer-to-Peer Multicast Streaming", *Invited Paper*, (Nov. 11, 2005).

Sheu, et al., "Chaining: A Generalized Batching Technique for Video-On-Demand Systems", *1997 IEEE*, (1997).

Zhang, et al., "CoolStreaming/DONet: A Data-driven Overlay Network for Peer-to-Peer Live Media Streaming", (2005).

Zhu, et al., "Multicast with Network Coding in Application-Layer Overlay Networks", (Jan. 2004).

EP Search Report dated Oct. 19, 2010~ Application No. 08794531.7-2413.

Chris Dana Et A~"BASS: BitTorrent Assisted Streaming System for Video on Demand"~IEEE 7th Workshop on Multimedia Signal Processing~Oct. 1, 2005~pp. 1-4.

Eric Setton et al~"Towards Quality of Service for Per-to-Peer Video Multicast"~IEEE Int'l Conf on Image Processing 2007~Sep. 1, 2007~pp. V-81.

Lei Zhang et al~"A peer-to-peer architecture for on-demand video streaming on Internet"~ICCAS 2004~IEEE Conf on Communications, Circuits and Systems Jun. 27, 2004 pp. 525-528 vol. 1.

Yufeng Shan et al~"hybrid video downloading/streaming over peer-to-peer networks"~Proc of the 2003 Int'l Conf on Multimedia and Expo~Jul. 6, 2003 pp. 665-668 vol. 2~.

* cited by examiner

200

Initiate a first connection to a peer of a peer-to-peer (P2P) network for receiving media content from the P2P nework
210

Concurrent to initiating the first connection, establishing a second connection with a data source
220

Receive the media content over the second connection
230

Establish the first connection
240

Receive the media content over the first connection
250

Disconnect the second connection
260

FIG. 2

ASSISTED PEER-TO-PEER MEDIA STREAMING

FIELD

Various embodiments of the present invention relate to the field of streaming media.

BACKGROUND

Peer-to-peer (P2P) networks are computer networks that rely on the distributed bandwidth of participant clients, referred to as "peers," for transmitting data. For instance, P2P networks are used for sharing data and for streaming media data. Media streaming to a large audience may be achieved by using a P2P network, where peers act both as receivers and as relays for the stream. P2P networks provide the benefit of distributing the throughput over a large number of peer devices. However, P2P networks typically include little infrastructure, and thus are subject to disruptions in streaming media. For example, the system could run out of bandwidth or peer devices may randomly disconnect from the P2P network.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 2 is a flowchart illustrating a process for assisted peer-to-peer (P2P) network connection, in accordance with one embodiment of the present invention.

Figure 1:
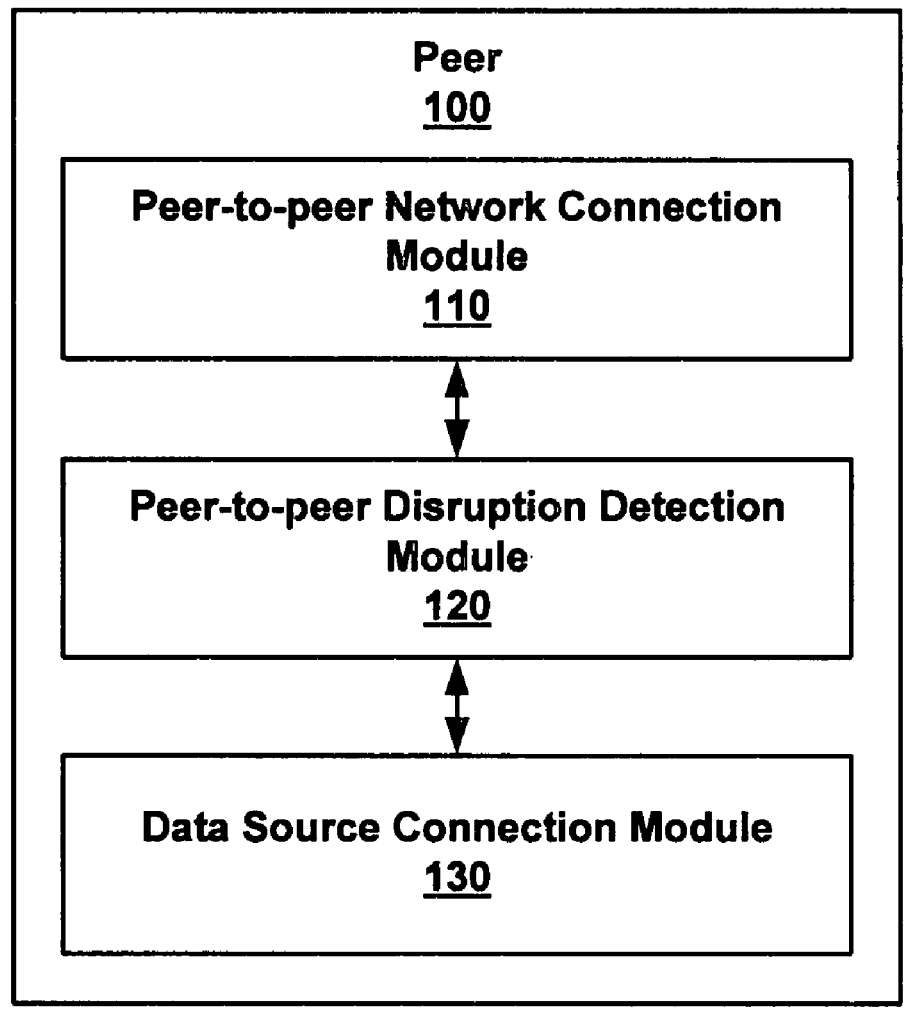
FIG. 1 is a block diagram of an example peer, in accordance with one embodiment of the present invention.

The drawings referred to in this description should not be understood as being drawn to scale except if specifically noted.

DESCRIPTION OF EMBODIMENTS

Various embodiments of the present invention, assisted peer-to-peer (P2P) media streaming, are described herein. In one embodiment, a method for assisted P2P media streaming is described. A first connection to at least one peer of a P2P network is initiated for receiving media content from the P2P network. Responsive to a disruption of delivery of the media content over the first connection from the peer, the media content is received over a second connection with a data source, wherein the data source comprises the media content.

Embodiments of the present invention enable a P2P streaming system to achieve similar performance as a content delivery network (CDN) while reducing the bandwidth cost. In one embodiment, a limited number of data sources, e.g., servers, can be used to improve the performance of a P2P system. For instance, embodiments of the present invention are useful for P2P streaming systems where a media stream is relayed to a large audience via a network of connected peers acting as receivers as well as potential forwarders of the stream. In such a system, access to servers can significantly improve performance. For instance, in one embodiment, servers can be instrumental in achieving fast connection times (e.g., on the order of a second), whereas startup times on the order of a minute are usually observed in state-of-the-art P2P streaming systems. In other embodiments, servers may act as reliable retransmission agents.

Reference will now be made in detail to various embodiments of the present invention, examples of which are illustrated in the accompanying drawings. While the present invention will be described in conjunction with the various embodiments, it will be understood that they are not intended to limit the invention to these embodiments. On the contrary, embodiments of the present invention are intended to cover alternatives, modifications and equivalents, which may be included within the spirit and scope of the appended claims. Furthermore, in the following description of various embodiments of the present invention, numerous specific details are set forth in order to provide a thorough understanding of embodiments of the present invention. In other instances, well known methods, procedures, components, and circuits have not been described in detail as not to unnecessarily obscure aspects of the embodiments of the present invention.

Various embodiments of the present invention provide assisted P2P media streaming. In one embodiment, responsive to a disruption of delivery of the media content over a connection to a P2P network, the media content over a connection to a data source. In one embodiment, the disruption is a startup delay in establishing the connection to the P2P network. In another embodiment, the disruption is a peer disconnecting from the P2P network, requiring the reestablishment of the connection to the P2P network. In another embodiment, the disruption is packet loss from the P2P network.

Although the embodiments of the present invention are described with respect to the streaming of video data, it should be understood that embodiments of the present invention are not limited to the streaming of video data. It should be appreciated that embodiments of the present invention also apply to other types of media, including without limitation: audio-based data, image-based data, graphics data, video-based data, text-based data, web page-based data, and the like. Moreover, it should be appreciated that embodiments of the present invention can also be applied to on-demand transmission, including synchronous (e.g., live), asynchronous (e.g., time-shifted), or download.

Embodiments of the present invention utilize a P2P network to distribute, in real-time, a media stream to a large population of peers at low cost, as well as a data source, such as a small number of servers, to ensure fast connection times and error-resilience. For example, embodiments of the present invention utilize a connection to a data source to provide fast recover from various events such as packet loss or parent peer disconnection. Moreover, by utilizing far fewer servers than a typical CDN, embodiments of the present invention provide a significant cost reduction compared to current commercial media multicasting. Furthermore, as the servers forward the media stream to new peers or peers that have lost a connection to the P2P network, embodiments of the present invention improve the startup latency and quality of P2P streaming systems.

FIG. 1 is a block diagram of an example peer 100, in accordance with one embodiment of the present invention. Peer 100 includes P2P connection module 110, P2P disruption detection module 120 and data source connection module 130. In one embodiment, peer 100 is implemented in a computing device capable of communicating over a network connection (not shown). For example, peer 100 may be any type of computing device, including without limitation computers, cellular telephones, personal digital assistants, television sets, set-top boxes, and any other computing device capable of receiving and transmitting data over a network.

It should be appreciated that P2P connection module 110, P2P disruption detection module 120 and data source connection module 130 can be implemented as software, hardware, firmware, or any combination thereof. Moreover, it should be appreciated that peer 100 may include additional components that are not shown so as to not unnecessarily obscure aspects of the embodiments of the present invention.

Figure 3A:
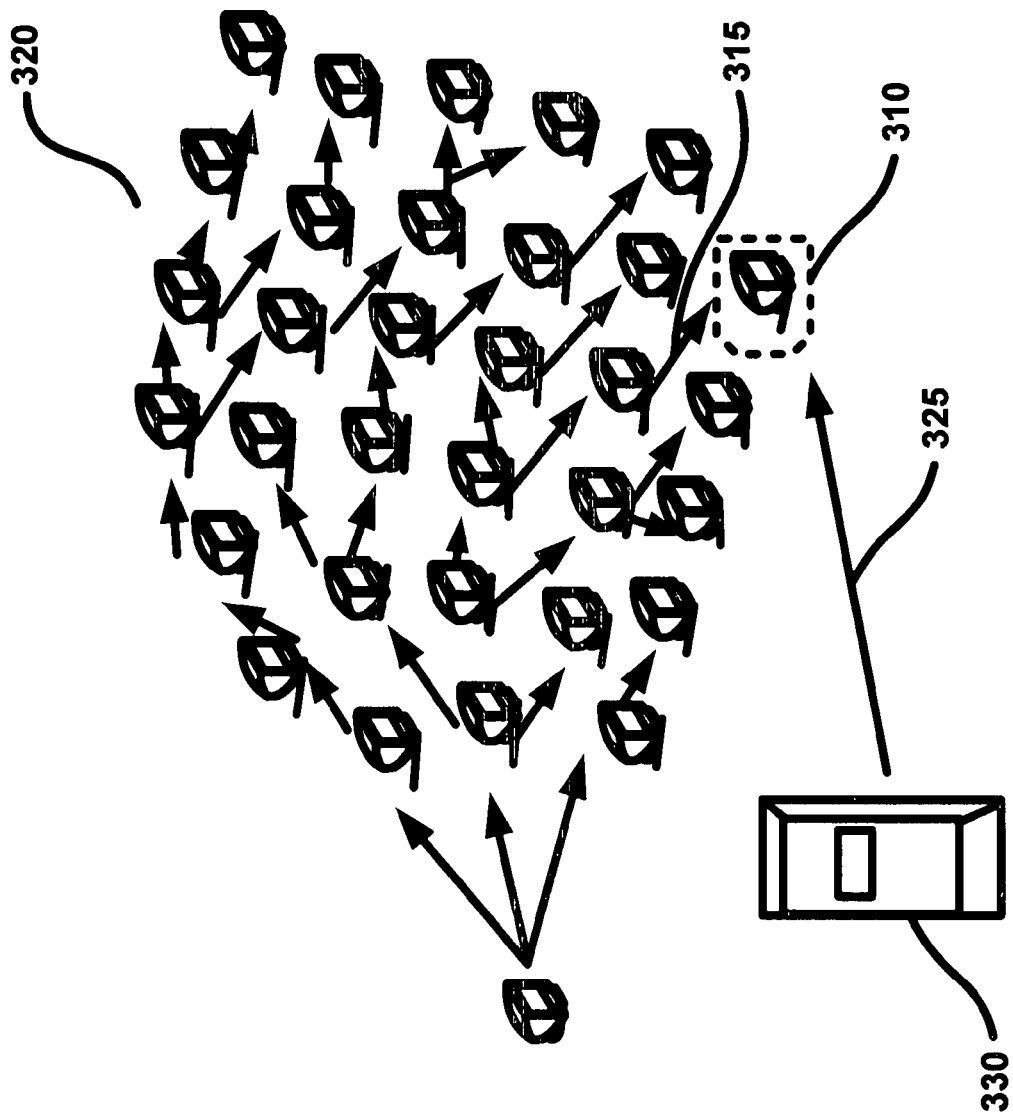
FIGS. 3A and 3B illustrate an example connection using assisted P2P network connection, in accordance with one embodiment of the present invention.

Peer 100, in conjunction with a data source, e.g., data source 330 of FIG. 3A, is operable to provide assisted P2P media streaming. Peer 100 is operable to act as a receiver and a forwarder of a media stream. For instance, when connected to a P2P network, peer 100 receives a media stream from the P2P network. It should be appreciated that peer 100 may be communicatively connected to any number of other peers of the P2P network for receiving different or multiple portions of the media stream. Moreover, peer 100 may forward the received media stream, or portions thereof, to other peers of the P2P network.

Due to the nature of P2P control protocols, in order to connect to a P2P multicast network, peer 100 first establishes connections to one or several connected peers which have enough available bandwidth to act as forwarders for the new peer. In one embodiment, P2P connection module 110 is operable to establish and maintain at least one connection to a P2P network. Where P2P connection module 110 is establishing an initial connection to a P2P network, in accordance with one embodiment, P2P connection module 110 performs the following operations. First, P2P connection module 110 makes initial contact with a P2P network device requesting a list of potential forwarding peer candidates. In one embodiment, the P2P network device is a peer. In another embodiment, the P2P network device is a server that maintains the list of potential forwarding peer candidates, but does not act as a peer. In one embodiment, the server also acts as a data source outside of the P2P network.

Once P2P connection module 110 receives the list of potential forwarding peer candidates, P2P connection module 110 facilitates an information exchange with at least one of the candidates to determine which candidate to select. For instance, the candidate or candidates are selected based in part on available bandwidth, geographic proximity, network connection characteristics, as well as other information or combinations thereof. Upon selecting at least one forwarding peer, a connection is established with the selected forwarding peer or peers.

It should be appreciated that each of the operations in establishing a connection between peer 100 and a P2P network may introduce delay. Moreover, since some of the peers may behind network address translation (NAT) and firewalls, connecting to them using certain types of protocols may increase this delay. Furthermore, the connection process may be unsuccessful and may have to be repeated, for instance, when throughput on the P2P network is limited.

In one embodiment, P2P disruption detection module 120 in combination with a data source is operable to reduce the latency inherent in connecting to a P2P network. In one embodiment, P2P disruption detection module 120 detects that P2P network connection module 110 has initiated a connection to a P2P network, but has not yet established such a connection. In one embodiment, as described above, the connection is initiated when peer 100 is first connecting to a P2P network. In another embodiment, the connection is initiated if a connection to the P2P network has been lost, and P2P network connection module 110 is attempting to reestablish a connection to the P2P network.

In one embodiment, P2P disruption detection module 120 reduces or precludes startup delay by providing an assisted P2P network connection. Peer 100 connects to a data source, e.g. a server or servers, which has access to the stream which is being forwarded to the peers. In one embodiment, peer 100 contacts the data source to request portions of the media content. While peer 100 establishes its connection to the P2P network, a connection is established to the data source by data source connection module 130, such that the media stream is received over the connection to the data source while the connection to the P2P network is being established. In one embodiment, the connection to the data source is a unicast connection, e.g., by way of an HTTP request. In one embodiment, when the connection to the P2P network is established, the connection to the data source is shutdown by data source connection module 130.

In one embodiment, the data source is a server. In another embodiment, the data source is comprised of a plurality of servers. It should be appreciated that in accordance with the present embodiment, each of the servers may have access to any portion of the media stream. For example, all servers can include the entire stream, each server can include a unique portion of the stream, servers can include varying and duplicated portions of the media stream, or any other configuration. Moreover, it should be appreciated that servers can be collocated, distributed across different nodes of a network, or any combination thereof. In one embodiment, the data source is comprised within a CDN.

It should be appreciated that, in accordance with one embodiment, there may be a period of time when the peer is connected to both the data source and the P2P network. This is useful, for example, to ensure there is no discontinuity (e.g., missing packets) between the packets transmitted from the data source and that received from the P2P network.

Due to the random nature of P2P networks, any participating peer may log off at any time and disrupt the media transmission to a large set of subsequent peers. In another embodiment, P2P disruption detection module 120 provides enhanced error resilience by providing an assisted P2P network error resilience where peer 100 connects to a data source, e.g. a server or servers, which has access to the stream which is being forwarded to the peers. In one embodiment, the connection to the data source is a unicast connection, e.g., by way of an HTTP request.

In one embodiment, P2P disruption detection module 120 directs data source connection module 130 to connect to a data source, e.g., a reliable retransmission server, to guarantee the delivery of missing portions of the media stream to peers which notice missing packets or which have been disconnected or partially disconnected from the P2P multicast. In one embodiment, peer 100 contacts the data source to request missing portions of the media content. For example, when P2P disruption detection module 120 detects that peer 100 has been disconnected from the P2P network, P2P disruption detection module 120 directs data source connection module 130 to establish a connection to the data source and to request the missing portions of the media stream. During this time, P2P disruption detection module 120 directs P2P network connection module 110 rebuild a connection to the P2P network. In one embodiment, when peer 100 has reestablished this connection and enough packets have been received to avoid any discontinuity in the media playout, the connection to the data source is shutdown or paused. In another embodiment, in the case of a random packet loss, due, for example, to a transmission error, peer 100 may request the missing packet directly from the data source, and connection to the P2P network does not need to be re-established.

In one embodiment, peer 100 predicts what may be missing in the future and preemptively requests that information from the data source. In the present embodiment, the detected disruption is predicted future packet loss. It should be appreciated that in the present embodiment, peer 100 predictively requests content from the data source, as opposed to only reactively requesting content when packets are deemed lost. In another embodiment, resource allocation can be performed, where the amount of content requested from the P2P network and from the data source is varied based on the available throughput from the peers of the P2P network 505.

As described above, embodiments of peer 100 are operable to provide assisted P2P network connection for reducing startup delay. FIG. 2 is a flowchart illustrating a process 200 for assisted P2P network connection, in accordance with one embodiment of the present invention. In one embodiment, process 200 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 200 is performed by peer 100 of FIG. 1.

Figure 3B:
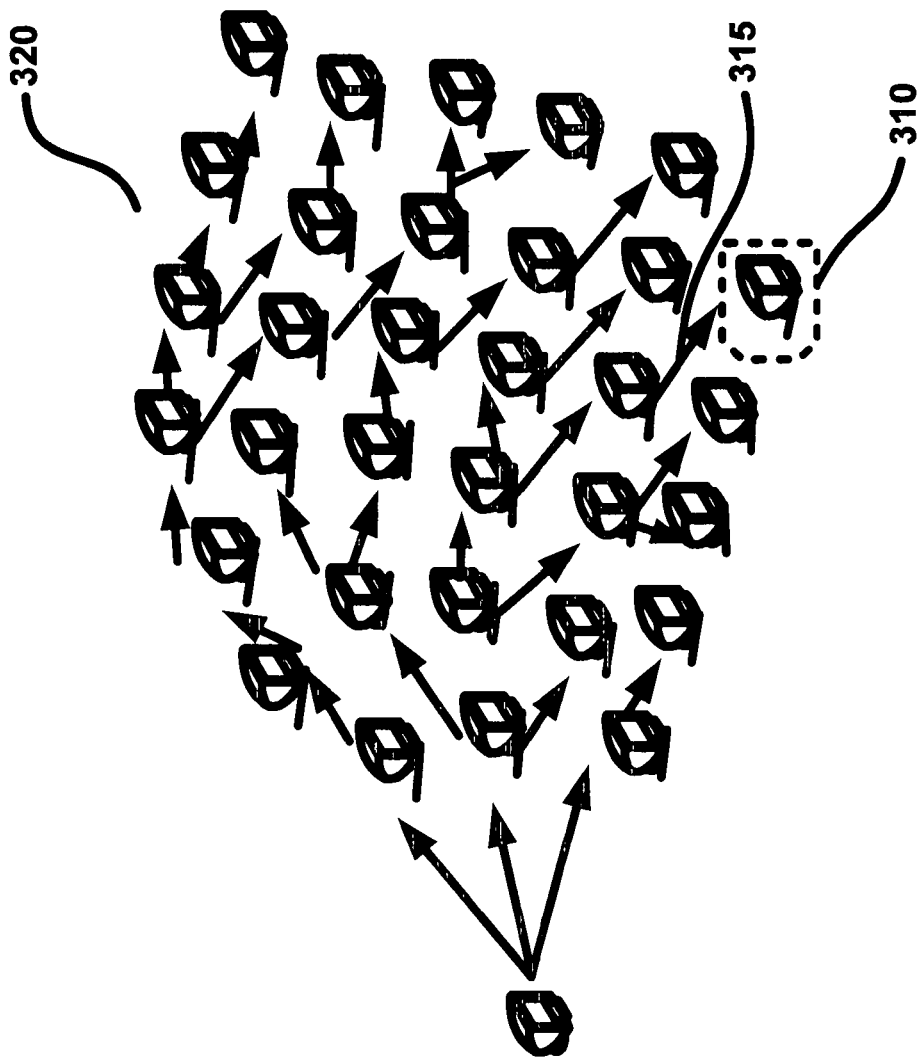

Process 200 is described with respect to FIGS. 3A and 3B. FIGS. 3A and 3B illustrate an example connection using assisted P2P network connection, in accordance with one embodiment of the present invention.

At 210 of process 200, a first connection is initiated to at least one peer of a P2P network for receiving media content from the P2P network. With reference to FIG. 3A, new peer 310 initiates connection 315 with a peer of P2P network 320. It should be appreciated that new peer 310 may initiate multiple connections with multiple peers of P2P network 320 and for purposes of brevity and clarity only connection 315 is described herein.

In order to establish connection 315, in one embodiment, new peer 310 makes initial contact with a P2P network device requesting a list of potential forwarding peer candidates. In one embodiment, the P2P network device is a peer. In another embodiment, the P2P network device is a server that maintains the list of potential forwarding peer candidates, but does not act as a peer. In one embodiment, the server also acts as a data source outside of the P2P network, e.g., data source 330. Once new peer 310 receives the list of potential forwarding peer candidates, new peer 310 exchanges information with at least one of the candidates to determine which candidate to select. In one embodiment, the first connection is not established until a forwarding peer is selected. It should be appreciated that this process of initiating and establishing a first connection to a P2P network can introduce latency and a delay in startup of the media content playout.

Concurrent to initiating connection to the P2P network, a second connection to a data source is established, as shown at 220. With reference to FIG. 3A, connection 325 is established with data source 330. In one embodiment, data source 330 is a server. In another embodiment, data source 330 includes a plurality of servers. In one embodiment, connection 325 to data source 330 is a unicast connection, e.g., by way of an HTTP request. It should be appreciated that, in one embodiment, the second connection with the data source is used at least while the new peer is initiating and up until the connection with the P2P network is established.

In one embodiment, connection 315 is initiated prior to establishing connection 325. In another embodiment, connection 325 is established prior to the initiation of connection 315. For example, in one embodiment, data source 330 may include the list of potential forwarding peer candidates. It should be appreciated that establishing connection 325 and initiating connection 315 may be executed in any order. It should also be appreciated that connection 325 is of the sort that is more quickly established than connection 315.

At 230, the media content is received over the second connection from the data source. With reference to FIG. 3A, new peer 310 receives the media content over connection 325 from data source 330. In one embodiment, the media content is received over connection 325 at least until connection 315 is established. By receiving the media content over connection 325 prior to the establishment of connection 315 to the P2P network, new peer 310 can receive the media content without being subject to startup delays inherent in the P2P network protocol.

At 240, the first connection is established. In one embodiment, upon selecting at least one forwarding peer from the list of potential forwarding peer candidates, a connection is established with the selected forwarding peer or peer.

At 250, the media content is received over the first connection from the P2P network. As shown in FIG. 3A, once connection 315 is established, new peer 310 is connected to P2P network 320. Accordingly, the media content is received from P2P network 320 over connection 315.

In one embodiment, as shown at 260, the second connection to the data source is disconnected. As shown in FIG. 3B, new peer 310 is connected to P2P network 320 over connection 315 and that no connection to a data source, e.g., data source 330 of FIG. 3A, remains. It should be appreciated that in other embodiments the second connection is paused rather than disconnected. This might allow for faster resumption of the connection to the data source in the event of a P2P network disruption.

It should be appreciated that, in accordance with one embodiment, there may be a period of time when the peer is connected to both the data source and the P2P network. This is useful, for example, to ensure there is no discontinuity (e.g., missing packets) between the packets transmitted from the data source and that received from the P2P network.

Figure 4:
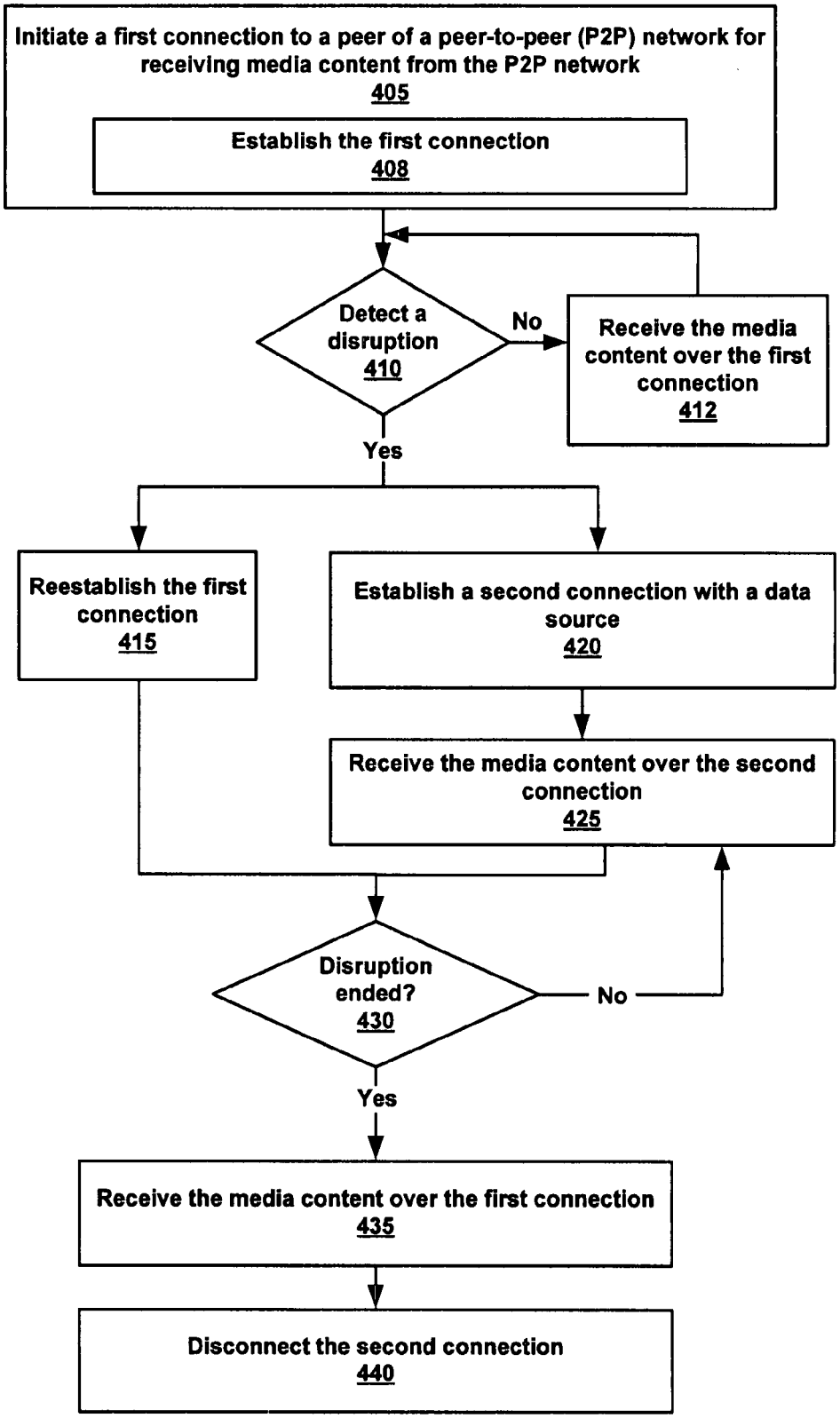
FIG. 4 is a flowchart illustrating a process for assisted P2P network error resilience, in accordance with one embodiment of the present invention.

As described above, embodiments of peer 100 are operable to provide assisted P2P network connection for reducing startup delay. FIG. 4 is a flowchart illustrating a process 400 for assisted P2P network error resilience, in accordance with one embodiment of the present invention. In one embodiment, process 400 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 400 is performed by peer 100 of FIG. 1.

Figure 5A:
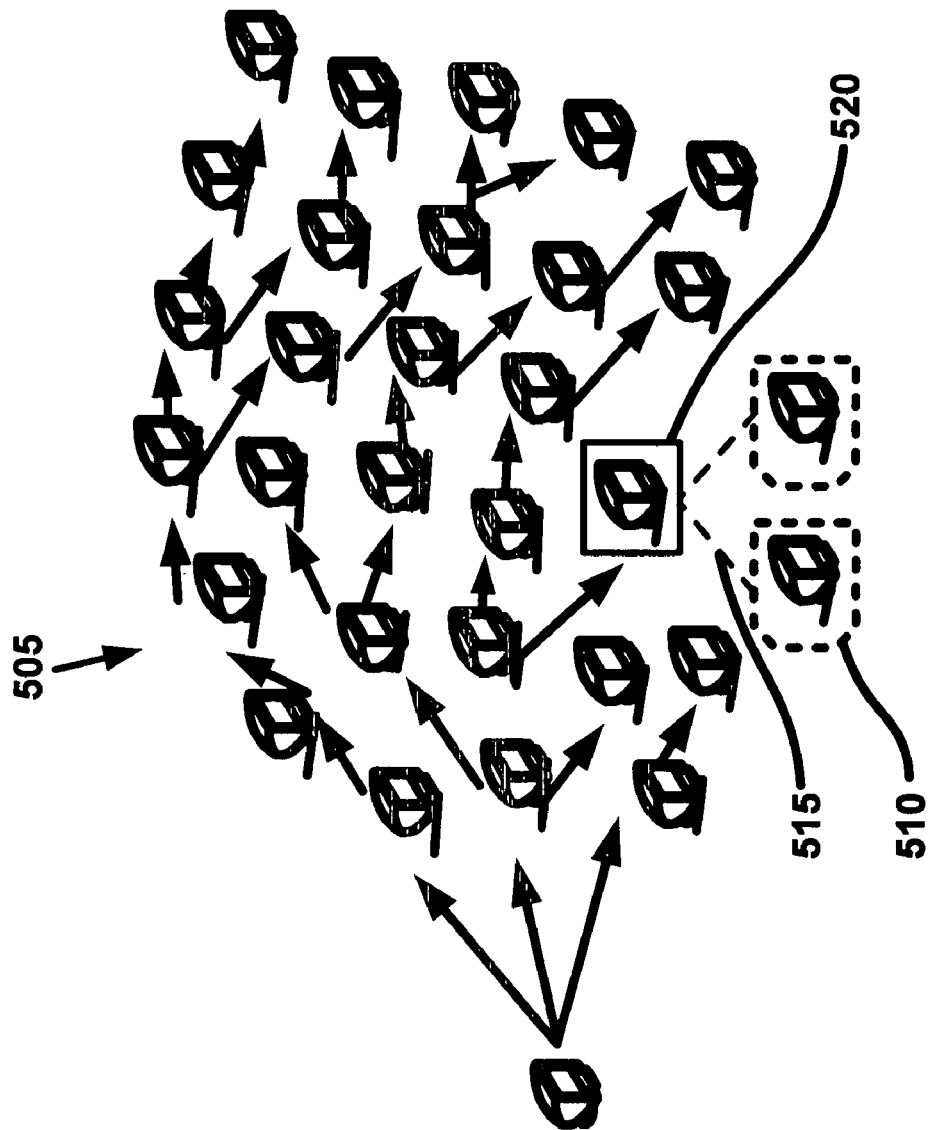
FIGS. 5A through 5C illustrate example P2P streaming using assisted P2P network error resilience, in accordance with one embodiment of the present invention.
Figure 5B:
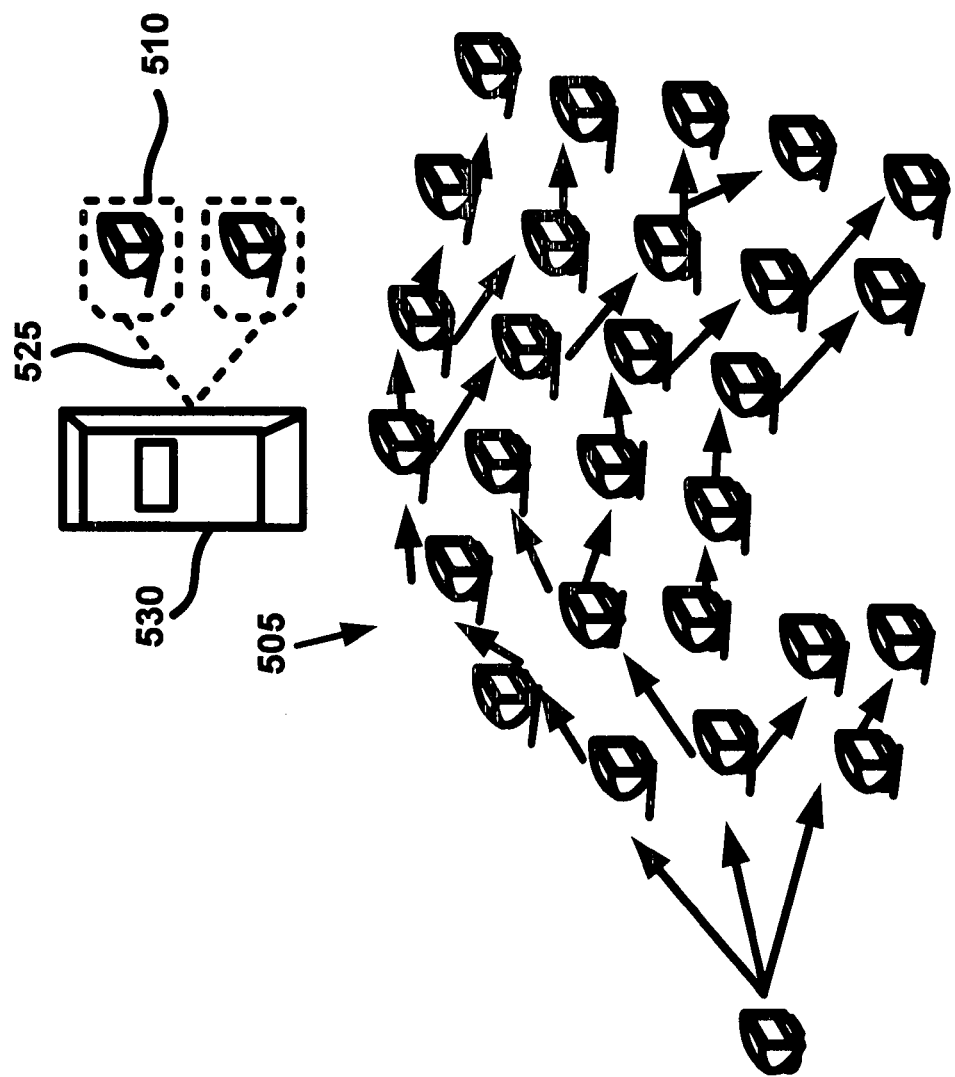
Figure 5C:
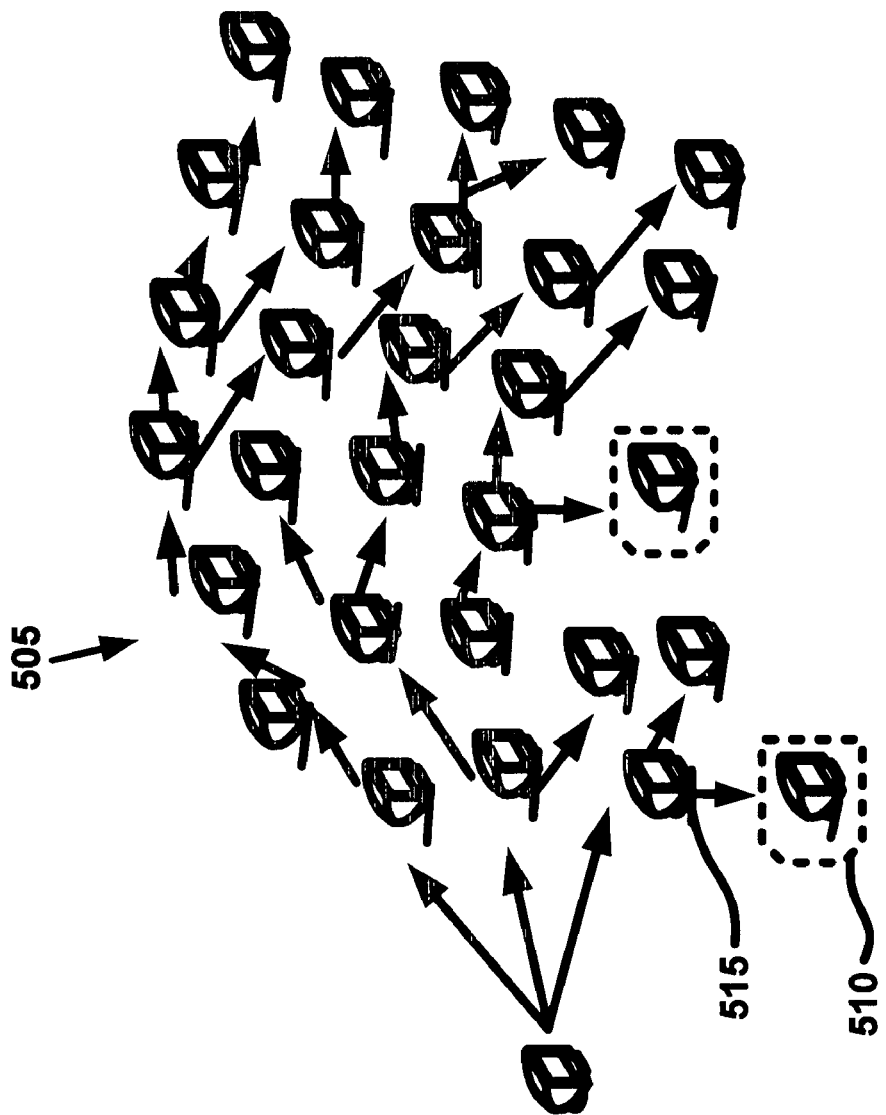

Process 400 is described with respect to FIGS. 5A through 5C. FIGS. 5A through 5C illustrate an example error resilience process for P2P streaming using assisted P2P network error resilience, in accordance with one embodiment of the present invention.

At 405 of process 400, a first connection is initiated to at least one peer of a P2P network for receiving media content from the P2P network. While process 400 is described primarily in accordance with assisted P2P network error resilience, process 400 can be generalized to include other embodiments described herein, such as assisted P2P network connection.

In one embodiment, as shown at 408, the first connection is established. At 410, it is determined whether a disruption in the first connection to the P2P network is detected. If no disruption is detected, the media content is received over the first connection from the P2P network, as shown at 412. The first connection is monitored by repeating 410 and 412 until a disruption is detected or until all media content is received and the first connection to the P2P network is disconnected. With reference to FIG. 5A, peer 510 receives media content from forwarding peer 520 of P2P network 505 over connection 515.

If a disruption in the first connection to the P2P network is detected, process 400 proceeds to 420. At 420, a second connection to a data source is established. In one embodiment, the peer contacts the data source to request portions of the media content. With reference to FIG. 5B, connection 525 is established with data source 530. In one embodiment, data source 530 is a server. In another embodiment, data source 530 includes a plurality of servers. In one embodiment, connection 525 to data source 530 is a unicast connection, e.g., by way of an HTTP request.

At 425, the media content is received over the second connection from the data source. With reference to FIG. 5B, peer 510 receives the media content over connection 525 from data source 530. By receiving the media content over connection 525 during the disruption of the connection to the P2P network 505, peer 510 can receive the media content without interruption caused by the disruption.

In one embodiment, the disruption includes a forwarding peer to which the peer is connected disconnecting from the P2P network. For example, with reference to FIG. 5A, forwarding peer 520 disconnects from P2P network 505. At 415, in accordance with one embodiment, the peer attempts to reestablish the first connection to the P2P network. It should be appreciated that the first connection need not be to a particular peer of the P2P network, but rather refers to the connection to the P2P network. In the present embodiment, the peer initiates a first connection to the P2P network for the purpose of reestablishing the connection to the P2P network. This process is similar to that described in 210 above, and is not repeated here for purposes of brevity. It should be appreciated that 415 is performed at least concurrently with 425. In one embodiment, 415 is performed concurrently with 420 and 425.

In another embodiment, the disruption is packet loss. It should be appreciated that this packet loss may or may not be associated with a forwarding peer disconnecting from the P2P network, but rather may be associated with the characteristics of the network transmission to the peer. In the present embodiment, since the first connection is not disconnected, 415 is not performed.

In one embodiment, the peer predicts what may be missing in the future and preemptively requests that information from the data source. In the present embodiment, the detected disruption is predicted future packet loss. For example, if the received media content from connection 515 is slowing down, peer 510 may interpret such slowing down as an indication that congestion is occurring. Peer 510 may then request some of the future required content from data source 530. It should be appreciated that in the present embodiment, peer 510 predictively requests content from data source 530, as opposed to only reactively requesting content when packets are deemed lost. In another embodiment, resource allocation can be performed, where the amount of content requested from P2P network 505 and from data source 530 is varied based on the available throughput from the peers of P2P network 505. For example, two-thirds of the packets can be requested from P2P network 505 and one-third of the packets can be requested from data source 530.

In another embodiment, the disruption includes the startup delay inherent in establishing a connection to a P2P network. In the present embodiment, the peer initiates a first connection to the P2P network for the purpose of reestablishing the connection to the P2P network. This process is similar to that described in 210 above, and is not repeated here for purposes of brevity.

At 430, it is determined whether the disruption has ended. In one embodiment, the disruption ends when the first connection to the P2P network is reestablished. In another embodiment, the disruption ends when the dropped packet or packets are received. If the disruption has not ended, process 400 returns to 425. The status of the disruption is monitored by repeating 425 and 430 until the disruption ends or until all media content is received and the second connection to the data source is disconnected.

If it is determined that the disruption has ended, the media content is received over the first connection from the P2P network, as shown at 435. As shown in FIG. 5C, once connection 515 is reestablished, peer 510 is connected to P2P network 505. Accordingly, the media content is received from P2P network 505 over connection 515. It should be appreciated that peer 510 can be connected to any forwarding peer or to any set of forwarding peers of P2P network 505. For example, where the disruption was packet loss, peer 510 might still be connected to the same forwarding peer or set of forwarding peers. In another example, where the disruption was a forwarding peer or a set of forwarding peers disconnecting from P2P network 505, connection 515 is established between peer 510 and a different forwarding peer or a different set of forwarding peers.

In one embodiment, as shown at 440, the second connection to the data source is disconnected. As shown in FIG. 5C, peer 510 is connected to P2P network 505 over connection 515 and that no connection to a data source, e.g., data source 530 of FIG. 5B, remains. It should be appreciated that in other embodiments that the second connection is paused rather than disconnected. This might allow for faster resumption of the connection to the data source in the event of a P2P network disruption.

It should be appreciated that, in accordance with one embodiment, there may be a period of time when the peer is connected to both the data source and the P2P network. This is useful, for example, to ensure there is no discontinuity (e.g., missing packets) between the packets transmitted from the data source and that received from the P2P network.

It should be appreciated that embodiments of the present invention may also implement a retransmission server in combination with other error resiliency methods. For example, a peer could request retransmissions from other connected peers before making use of the server.

The embodiments of the P2P network depicted in FIGS. 3A, 3B, 5A, 5B and 5C indicate that peers are connected by an application layer multicast tree. It should be appreciated that this implementation is not required, and that other types of P2P streaming network can be implemented. In one embodiment, the P2P network relies on multiple multicast trees to relay the media stream to its members. In such a system, complementary portions of the stream are sent on different trees. In such a system, a data source would be used to forward the substream associated with each of the multicast trees to which connections have not yet been established by the joining peer. Likewise, if the peer is disconnected from any of the multicast trees, the missing portion of the stream will be requested from the retransmission data source while the peer rebuilds its faulty connection(s).

In another embodiment, in an unstructured P2P streaming system, packets are exchanged between peers, without having to build explicit multicast trees, and packet maps are exchanged between connected peers to locate missing portions of the media stream. In this type of system, in one embodiment, the media stream is sent directly from a data source to a connecting peer until the latter has connected to at least N other peers, where N is any given positive number. Packets that have not been located after M packet map exchanges are requested directly from a data source, where M is any given positive number.

Embodiments of the present invention enable a P2P streaming system to achieve similar performance CDN while reducing the bandwidth cost. In one embodiment, a limited number of data sources, e.g., servers, can be used to improve the performance of a P2P system. For instance, in one embodiment, connection to a data source assists in achieving fast connection times. In another embodiment, connection to a data source assists in error resilience.

In summary, embodiments of the present invention provide for data source assisted peer-to-peer media streaming. In one embodiment, the present invention provides an assisted P2P network connection for reducing startup delay associated with connecting to a P2P network. In another embodiment, the present invention provides assisted P2P network error resilience.

Various embodiments of the present invention, assisted peer-to-peer media streaming, are thus described. While the present invention has been described in particular embodiments, it should be appreciated that the present invention should not be construed as limited by such embodiments, but rather construed according to the following claims.

What is claimed is:

1. A method for assisted peer-to-peer media streaming, said method comprising:
receiving a list of potential peer candidates from a peer device;
directly initiating a first connection to at least one peer of a peer-to-peer network for receiving media content from said peer-to-peer network, wherein said at least one peer is on said list of potential peer candidates;
responsive to a disruption of delivery of said media content over said first connection from said peer, establishing a second connection to a data source outside of said peer-to-peer network and receiving said media content over said second connection with said data source, wherein said data source comprises said media content and wherein said second connection is initiated directly with said data source, and wherein said data source outside of said peer-to-peer network does not act as a peer, and wherein said data source outside of said peer-to-peer network is a reliable retransmission server that guarantees delivery of missing portions of said media content;
reestablishing said first connection to at least one peer of said peer-to-peer network; and
responsive to said reestablishing said first connection, disconnecting said second connection.

2. The method of claim 1 further comprising:
responsive to said disruption ending such that said media content is received over said first connection, disconnecting said second connection.

3. The method of claim 1 wherein said disruption comprises a startup delay in establishing said first connection with said peer-to-peer network, said method further comprising:
responsive to reestablishing said first connection, disconnecting said second connection.

4. The method of claim 1 wherein said disruption comprises packet loss over said first connection, wherein said receiving said media content over a second connection further comprises:
receiving at least one missing packet over said second connection.

5. The method of claim 1 wherein said data source comprises at least one server.

6. The method of claim 5 wherein said data source comprises a plurality of servers, wherein each server of said plurality of servers comprises at least a portion of said media content.

7. The method of claim 1 further comprising:
responsive to said disruption, requesting portions of media content from said data source.

8. The method of claim 1 further comprising:
predicting future packet loss; and
preemptively requesting media content comprising said future packet loss from said data source.

9. A method for assisted peer-to-peer network connection, said method comprising:
receiving a list of potential peer candidates from a peer device;
directly initiating a first connection to at least one peer of a peer-to-peer network for receiving media content from said peer-to-peer network, wherein said at least one peer is on of said list of potential peer candidates;
concurrent to said initiating said first connection, establishing a second connection with a data source outside of said peer-to-peer network, wherein said data source comprises said media content and wherein said second connection is initiated directly with said data source, wherein said data source outside of said peer-to-peer network does not act as a peer, and wherein said data source outside of said peer-to-peer network is a reliable retransmission server that guarantees delivery of missing portions of said media data;
receiving said media content over said second connection;
reestablishing said first connection to at least one peer of said peer-to-peer network; and
responsive to reestablishing said first connection, disconnecting said second connection.

10. The method of claim 9 further comprising:
establishing said first connection; and
responsive to establishing said first connection, receiving said media content over said first connection.

11. The method of claim 10 further comprising:
disconnecting said second connection such that said media content is received over said first connection.

12. The method of claim 9, wherein said second connection comprises a unicast connection to said data source.

13. The method of claim 9 wherein said data source comprises a plurality of servers, wherein each said server of said plurality of servers comprises at least a portion of said media content.

14. One or more computing device non-transitory readable media for storing instructions that when executed by one or more processors perform a method for assisted peer-to-peer network error resilience, said method comprising:
detecting packet loss over a first connection to a peer-to-peer network, said first connection for receiving media data and wherein said first connection is initiated directly with a first peer of said peer-to-peer network wherein said first peer was selected from a list of potential peer candidates received from a peer device; and responsive to said packet loss, establishing a second connection to a data source outside of said peer-to-peer network and receiving said media data over said second connection to said data source, wherein said data source comprises said media data and wherein said second connection is initiated directly with said data source, wherein said data source outside of said peer-to-peer network does not act as a peer, and wherein said data source outside of said peer-to-peer network is a reliable retransmission server that guarantees delivery of missing portions of said media data;

reestablishing said first connection to said peer-to-peer network; and responsive to reestablishing said first connection, disconnecting said second connection.

15. The one or more computing device non-transitory readable media as recited in claim 14, wherein said method further comprises:
    responsive to said packet loss, establishing said second connection to said data source.

16. The one or more computing device non-transitory readable media as recited in claim 14, wherein said detecting said packet loss over said first connection to said peer-to-peer network comprises:
    detecting a peer disconnecting from said peer-to-peer network.

17. The one or more computing device non-transitory readable media as recited in claim 14, wherein said second connection comprises a unicast connection to said data source.

18. The one or more computing device non-transitory readable media as recited in claim 14, wherein said data source comprises a plurality of servers, wherein each said server of said plurality of servers comprises at least a portion of said media data.

* * * * *